(12) United States Patent
Achtermann et al.

(10) Patent No.: US 6,615,274 B1
(45) Date of Patent: Sep. 2, 2003

(54) COMPUTER NETWORK CONTROL SYSTEMS AND METHODS

(75) Inventors: Jeffrey Mark Achtermann, Austin, TX (US); Arabinda Bose, Cedar Park, TX (US); Alberto Giammaria, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/458,268

(22) Filed: Dec. 9, 1999

(51) Int. Cl.⁷ .............................................. G06F 13/00

(52) U.S. Cl. ..................... 709/244; 709/102; 709/203; 709/224

(58) Field of Search ................................ 709/100, 102, 709/103, 104, 201, 202, 203, 219, 223, 224, 238, 244

(56) References Cited

U.S. PATENT DOCUMENTS

| | | | |
|---|---|---|---|
| 4,523,206 A | 6/1985 | Sasscer | 364/200 |
| 4,697,266 A | 9/1987 | Finley | 371/12 |
| 5,367,643 A | 11/1994 | Chang et al. | 395/325 |
| 5,446,874 A | 8/1995 | Waclawsky et al. | 395/575 |
| 5,448,230 A | 9/1995 | Schanker et al. | 340/870.03 |
| 5,455,934 A | 10/1995 | Holland et al. | 395/404 |
| 5,457,683 A | 10/1995 | Robins | 370/60 |
| 5,566,306 A | 10/1996 | Ishida | 395/309 |
| 5,572,678 A | 11/1996 | Homma et al. | 395/200.12 |
| 5,586,256 A | 12/1996 | Thiel et al. | 395/200.03 |
| 5,590,124 A | 12/1996 | Robins | 370/258 |
| 5,680,602 A | 10/1997 | Bloem et al. | 395/601 |
| 5,701,482 A | 12/1997 | Harrison et al. | 395/675 |
| 5,701,484 A * | 12/1997 | Artsy | 709/303 |
| 5,724,516 A | 3/1998 | Temoshenko | 395/200.32 |
| 5,726,979 A * | 3/1998 | Henderson et al. | 370/254 |
| 5,745,783 A | 4/1998 | Suzuki et al. | 395/825 |
| 5,754,763 A | 5/1998 | Bereiter | 395/187.01 |
| 5,799,323 A | 8/1998 | Mosher, Jr. et al. | 707/202 |
| 5,805,920 A | 9/1998 | Sprenkle et al. | 395/821 |
| 5,819,083 A | 10/1998 | Chen et al. | 395/610 |
| 5,842,212 A | 11/1998 | Ballurio et al. | 707/100 |
| 6,240,335 B1 * | 5/2001 | Wehrung et al. | 700/230 |

FOREIGN PATENT DOCUMENTS

| | | |
|---|---|---|
| EP | 0 192 120 | 8/1986 |
| EP | 0 711 088 | 5/1996 |
| EP | 0 871 123 | 10/1998 |
| IE | 66464 | 4/1994 |
| JP | 7-50673 | 2/1995 |
| JP | 9-331323 | 12/1997 |
| JP | 10-303890 | 11/1998 |
| SU | 1741145 A2 | 6/1992 |
| WO | WO 97/15018 | 4/1997 |
| WO | WO97/38624 | 10/1997 |

OTHER PUBLICATIONS

"Error Handler Activation Procedure," *IBM Technical Disclosure Bulletin*, vol. 37 No. 08, Aug. 1994, pp. 231–232.

"Transferring Bulk Data in Message Queueing System," *IBM Technical Disclosure Bulletin*, vol. 41 No. 01, Jan. 1998, pp. 437–438.

(List continued on next page.)

Primary Examiner—Viet D. Vu

(57) ABSTRACT

A method of effectuating control actions in a computer network including a server running a Distribution Manager program, a database and a hierarchy of repeaters and endpoints. A selected control action is initiated and a distribution identifier passed to the Distribution Manager identifying a data distribution to be controlled. The Distribution Manager retrieves information from the database identifying a route through the hierarchy of repeaters and endpoints for the data distribution. The Distribution Manager also creates a control message identifying the selected control action and passes the message through the hierarchy of repeaters and endpoints via the identified route.

22 Claims, 11 Drawing Sheets

OTHER PUBLICATIONS

"Execution Time Dynamic Data Collection at First Detection of Failure," *IBM Technical Disclosure Bulletin*, vol. 37 No. 06B, Jun. 1994, pp. 391–392.

"'Variable Paged Array' Datatype," *IBM Technical Disclosure Bulletin*, vol. 37 No. 07, Jul. 1994, pp. 89–92.

"Distributing a Document Using a Regional Reference," *IBM Technical Disclosure Bulletin*, vol. 33 No. 3A, Aug. 1990, p. 251.

"Using Data Link Control–Level Feedback to Control Application Buffer Usage and Packet Loss," *IBM Technical Disclosure Bulletin*, vol. 41 No. 01, Jan. 1998, pp. 199–204.

"Dynamic Determination of Network Topology," *IBM Technical Disclosure Bulletin*, vol. 38 No. 03, Mar. 1995, pp. 411–418.

"Pointer Collection and Reporting for Error Recovery Procedures Branching," *IBM Technical Disclosure Bulletin*, vol. 39 No. 07, Jul. 1996, pp. 87–90.

"Hybrid Switch Control Scheme for Fast Point–to–Point/Multicast/Hunt–Group Connection Setup," *IBM Technical Disclosure Bulletin*, vol. 37 No. 11, Nov. 1994, pp. 641–646.

"Flow Control of Prioritized Data in a Multimedia Communications System," *IBM Technical Disclosure Bulletin*, vol. 37 No. 01, Jan. 1994, pp. 531–532.

"Distributed Object Encapsulation of Customer Information Control System Distributed Transaction Processing," *IBM Technical Disclosure Bulletin*, vol. 38 No. 01, Jan. 1995, pp. 177–180.

"Reconciliation of Shadowed Mail Items with Master," *IBM Technical Disclosure Bulletin*, vol. 33 No. 6B, Nov. 1990, pp. 120–121.

"Riadata—An Automated Retain Incident Analysis Facility," *IBM Technical Disclosure Bulletin*, vol. 34 No. 10A, Mar. 1992, pp. 278–283.

Cao G. et al., "Low–cost Checkpointing with Mutable Checkpoints in Mobile Computing Systems," International Conference on Distributed Computing Systems, 18th, Amsterdam, May 26–29, 1998, Proceedings, pp. 464–471.

Wiener, J.L. et al., "OODB Bulk Loading Revisited: the Partitioned–list Approach," International Conference on Very Large Data Bases, 21st, Zurich, Sep. 11–15, 1995, Proceedings of VLDB '95, pp. 30–41.

Muntz, D.A. et al., "Evaluating Delayed Write in a Multi-level Caching File System," IFIP/IEEE International Conference on Distributed Platforms, [Dresden, Feb. 27–Mar. 1, 1996], Proceedings: Client/Server and Beyond, pp. 415–429.

Jakoby, A. et al., "Data Transmission in Processor Networks," International Workshop on Distributed Algorithms, 9th, Proceedings of WDAG '95, pp. 145–159.

Joshi, A. et al., "On Disconnected Browsing of Distributed Information," International Workshop on Research Issues in Data Engineering, 7th, Birmingham, UK, Apr. 7–8, 1997, Proceedings: High Performance Database Management for Large–scale Applications, pp. 101–107.

Saglietti, F., "Dynamic Decision on Checkpointing by Use of Reduced Ordered Binary Decision Diagrams," International Conference on Computer Safety, Reliability and Security, 16th, York, UK, Sep. 7–10, 1997, [Proceedings of] SAFECOMP '97.

* cited by examiner

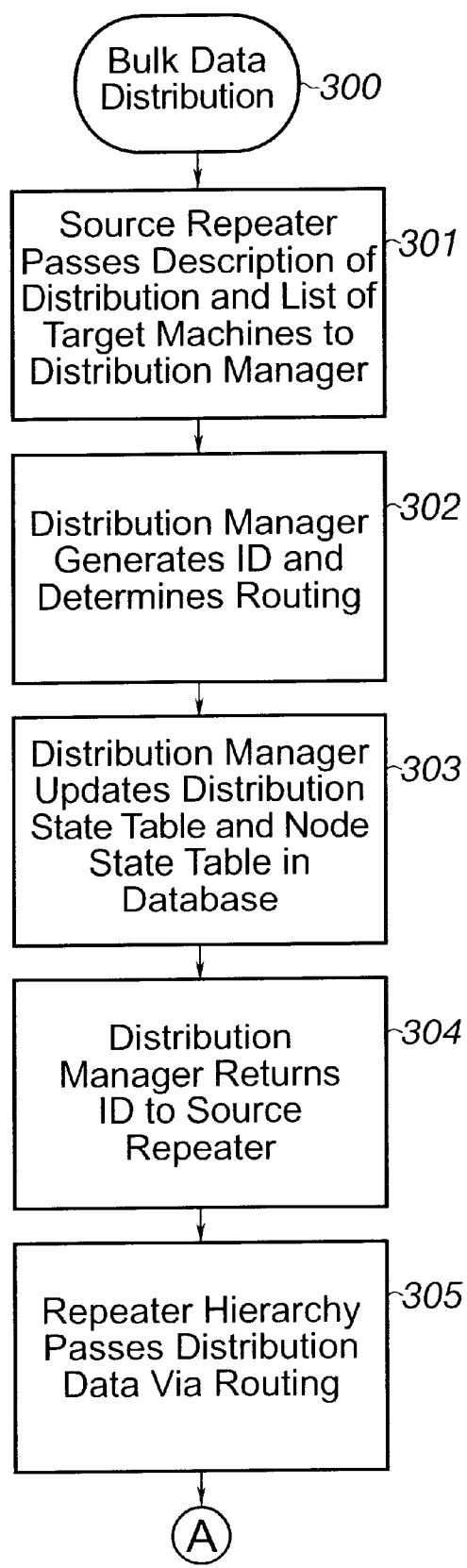
Fig. 3a
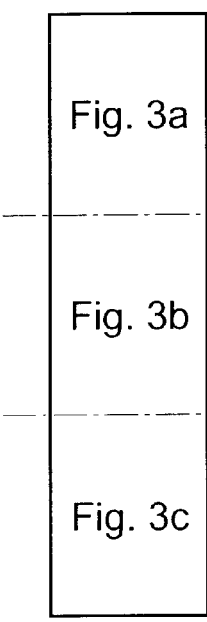

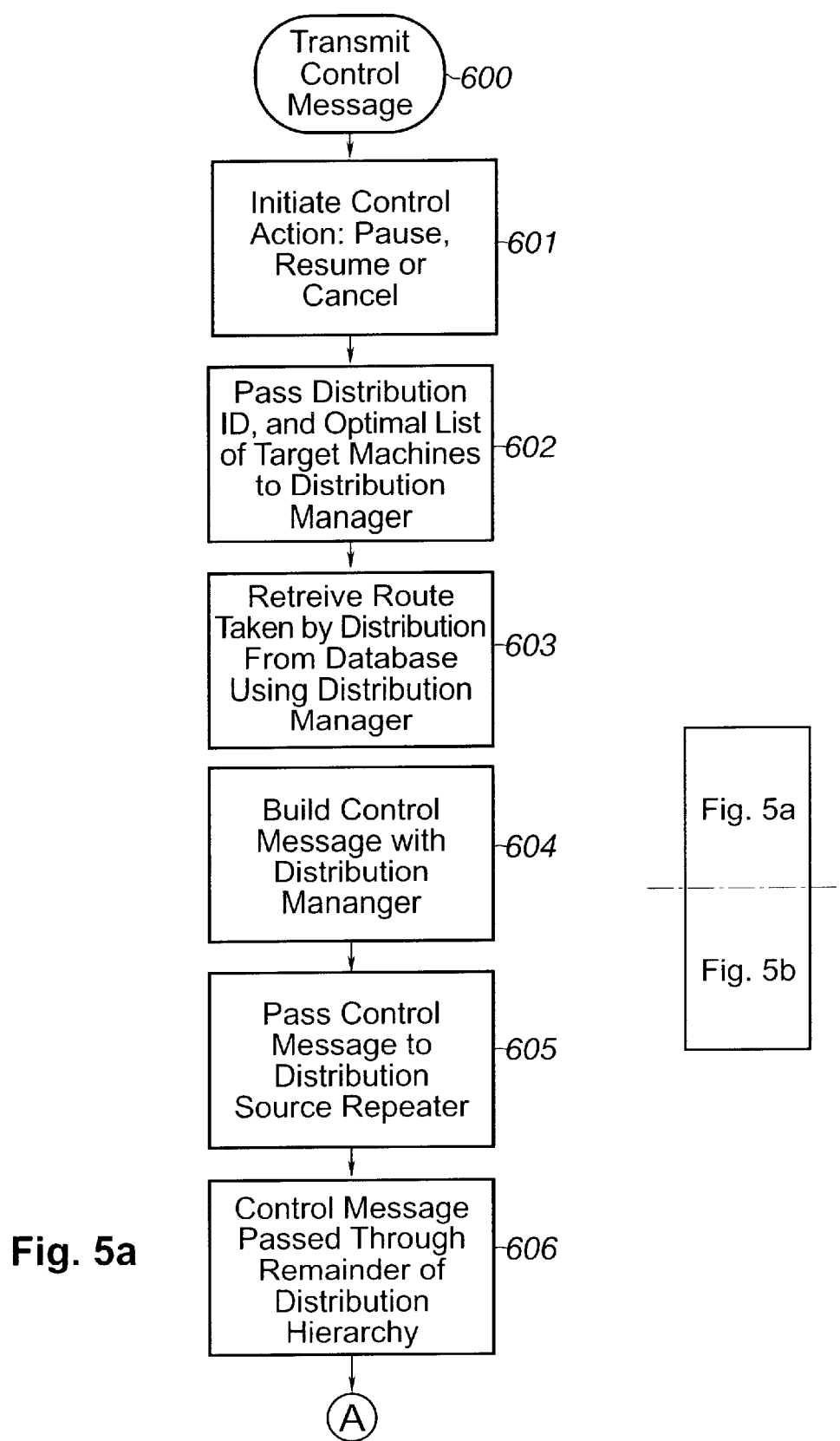

COMPUTER NETWORK CONTROL SYSTEMS AND METHODS

CROSS-REFERENCE TO RELATED APPLICATIONS

Related subject matter may be found in the following commonly assigned, U.S. Patent Applications which are hereby incorporated by reference herein:

Ser. No. 09/438,437, entitled "AN APPARATUS AND METHOD FOR DISTRIBUTING AND COLLECTING BULK DATA BETWEEN A LARGE NUMBER OF MACHINES";

Ser. No. 09/460,855, entitled "APPARATUS FOR DATA DEPOTING AND METHOD THEREFOR";

Ser. No. 09/460,853, entitled "APPARATUS FOR RELIABLY RESTARTING INTERRUPTED DATA TRANSFER AT LAST SUCCESSFUL TRANSFER POINT AND METHOD THEREFOR, now U.S. Pat. No. 6,526,447";

Ser. No. 09/438,436, entitled "APPARATUS FOR CONNECTION MANAGEMENT AND METHOD THEREFOR";

Ser. No. 09/460,852, entitled "METHODS OF DISTRIBUTING DATA IN A COMPUTER NETWORK AND SYSTEMS USING THE SAME";

Ser. No. 09/458,269, entitled "SYSTEMS AND METHODS FOR REAL TIME PROGRESS MONITORING IN A COMPUTER NETWORK;

Ser. No. 09/460,851, entitled "APPARATUS FOR AUTOMATICALLY GENERATING RESTORE PROCESS DURING SOFTWARE DEPLOYMENT AND METHOD THEREFOR"; and Ser. No. 09/460,854, entitled "AN APPARATUS FOR JOURNALING DURING SOFTWARE DEPLOYMENT AND METHOD THEREFOR".

TECHNICAL FIELD

The present invention relates generally to networking, and in particular to computer network control systems and methods.

BACKGROUND INFORMATION

Network distribution of software products has become one of the most important means by which a software vendor can efficiently and conveniently support its customers. Notwithstanding, these procedures take time, which often results in frustration and impatience on the part of the receiving customers. For example, a distribution of a large software package (i.e., greater than 100 megabytes) to a large number of end user machines (i.e., greater than a 1000) can take many hours if not days. During this time, the end users are often left wondering about the status of the download. In addition, a distribution can encounter a variety of errors and similar anomalies, including unavailable target machines on the network, failed installation on various end user machines, and network outages. In these cases, both the distributing entity and the end users have a vested interest in monitoring the distribution progress.

Currently available software distribution methods provide little, if any, feedback to the end users with regards to the progress and status of the download process. Often the end users are presented with a simple hourglass icon on their computer screens which indicates that the process has been initiated, but provides little information as to when the distribution might finish or if any errors have been encountered. It is not until the distribution is finally finished, that the end user is provided with a dialog box indicating that either the download has been successful or that an error has occurred at some point during the process. The actual source of any errors may or may not be clearly identified. Moreover, once a distribution has been initiated, it cannot be canceled, unless the downloading server is restarted by specific invocation of a command line. When this happens, the states of each node in the network can be left in an indeterminate state.

In sum, the need has arisen for systems and methods which reduce the level of frustration often experienced by end users patiently awaiting the receipt of a software distribution. Among other things, these systems and methods should allow the end users to monitor the progress to get a reasonable idea of when the distribution might finish as well as advising those end users of any errors which have occurred which are affecting the download process. Moreover, provision would preferably be made to allow closer control of the distribution process including but not limited to the ability to pause, resume or abort an active distribution.

SUMMARY OF THE INVENTION

According to the principles of the present invention, a method is disclosed for effectuating control actions in a computer network including a server running a Distribution Manager program, a database and a hierarchy of repeaters and endpoints. A selected control action is initiated and a distribution identifier passed to the Distribution Manager for identifying a data distribution to be controlled. The Distribution Manager retrieves information from the database identifying a route through the hierarchy of repeaters and endpoints for the data distribution. A control message is created by the Distribution Manager, which identifies the selected control action, and the message is passed via the identified route through the hierarchy of repeaters and endpoints.

One network embodying the principles of the present invention includes a plurality of data processing endpoints and a plurality of repeaters for selectively distributing data to those endpoints. The Distribution Manager receives information initiating a control action for a selected data distribution and in response, retrieves information from an associated database identifying a route of the selected data distribution to selected ones of the endpoints through selected ones of the repeaters. A control messages is generated by the Distribution Manager for effectuating the control action in the selected end user terminals. The control message includes an identifier of the control message, a identifier of the distribution to be controlled, an identifier of the selected control action, and an identifier of the route through the repeaters to the end points. The controlled message is passed to the selected repeaters for transmission to the selected end user terminals via the identified route.

The present inventive principles thus allow a greater control over data distributions being handled by a computer network. In particular, a given distribution can quickly and efficiently pause, cancel or resume from pause, although other control actions are possible.

The foregoing has outlined rather broadly the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWINGS

For a more complete understanding of the present invention, and the advantages thereof, reference is now made to the following descriptions taken in conjunction with the accompanying drawings, in which:

FIGS. 3a–3c are flow diagrams illustrating a bulk data distribution procedure embodying the principles of the present invention;

DETAILED DESCRIPTION

Figure 1:
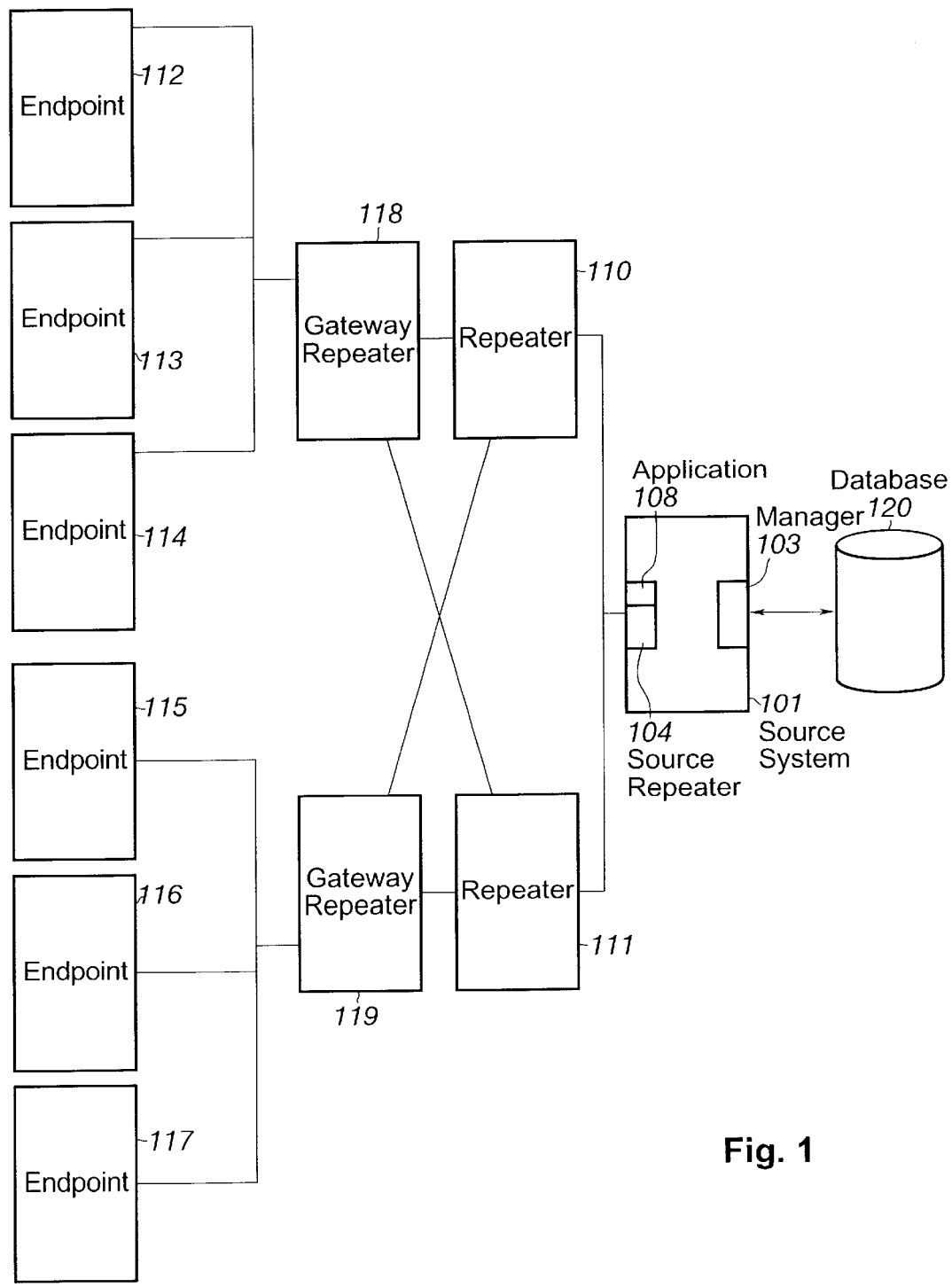
FIG. 1 is a high level diagram of an exemplary computer networking system suitable for practicing the principles of the present invention.

In the following description, numerous specific details are set forth to provide a thorough understanding of the present invention. However, it will be obvious to those skilled in the art that the present invention may be practiced without such specific details. In other instances, well-known circuits have been shown in block diagram form in order not to obscure the present invention in unnecessary detail. For the most part, details concerning timing considerations and the like have been omitted inasmuch as such details are not necessary to obtain a complete understanding of the present invention and are within the skills of persons of ordinary skill in the relevant art. Referring to the drawings, depicted elements are not necessarily shown to scale, and like or similar elements are designated by the same reference numeral through the several views.

FIG. 1 is a high level functional block diagram of a computer network 100 suitable for practicing the principles of the present invention. It should be noted that network 100 is for illustrative purposes and that in actual applications of the principles of the present invention, network 100 may include a larger or even much larger number of network nodes and corresponding cross-connections.

Network 100 is based upon a server 101 operating in conjunction with a database 120. For purposes of the present discussion, server 101 maintains the distribution manager software system 103 ("distribution manager") which provides administrative control for the bulk transfer of data throughout network 100, and manages database 120.

The network system 100 includes source system 101, one or more fan-out or, repeaters 110, 111, 118, 119, and a plurality of endpoints 112–117 (which may also be referred to as target machines or, simply, targets). Additionally, certain repeaters, such as 118 and 119, are directly connected to one or more endpoints, in the exemplary embodiment of FIG. 1, endpoints 112–114 or 115–117, respectively, and may be referred to as "gateway" repeaters (or, simply, "gateways").

Source system 101 provides distribution services with respect to resources 112–117. Endpoints 112–117 may operate in association with corresponding applications, one or more of applications 108a–108l which may initiate a data distribution. Initiation of a distribution via a distribution request is described in the commonly owned co-pending U.S. Patent Application entitled "An Apparatus and Method For Distributing and Collecting Bulk Data Between a Large Number of Machines, incorporated by reference herein. Note that source system 101 and endpoints 112–117 interface to repeaters 110 and 111 using the same methodologies as repeaters 110 and 111 interface with, for example, repeaters 118 and 119. Viewed logically, source system 110 and endpoints 112–117 each may include a "repeater". In other words, as an artisan of ordinary skill would recognize, as used herein, a repeater may be a logical element, that may be, but is not necessarily associated with a physical stand-alone hardware device in network 100. Repeater 110 may be the primary repeater through which resources 112–114 receive their data transfers, and repeater 111, likewise, may primarily service endpoints 115–117. It would be understood by an artisan of ordinary skill that additional repeaters may be inserted into the network and may be arranged in a multi-level hierarchy according to the demands imposed by the network size.

Gateway repeaters 118 and 119 are such repeaters in the exemplary embodiment of FIG. 1.

However, network system 100 may provide cross connections in order to provide redundant, parallel communication paths should the primary communication path to the endpoint become unavailable. For example, in FIG. 1, endpoint 114 has a primary pathway to source system 101 through repeaters 118 and 110. (A source system, such as source system 101 may also be referred to as a source node.) Should repeater 110 become unavailable, source system 101 can transfer bulk data to endpoint 114 via an alternative pathway through repeaters 118 and 111. Additionally, should repeater 118 become unavailable, endpoint 114 may receive data via repeaters 111 and 119.

A graphics user interface (GUI) 107 is provided, as discussed further below, to allow the system user or administrator monitoring of data distributions across the network. Graphics user interface 107 is effectuated, for example, by a workstation or PC similar to that illustrated in FIG. 2. Data distributions may be initiated by graphical users interfaces and/or applications programs 108a–l running at any of the endpoints 112–117.

Figure 2:
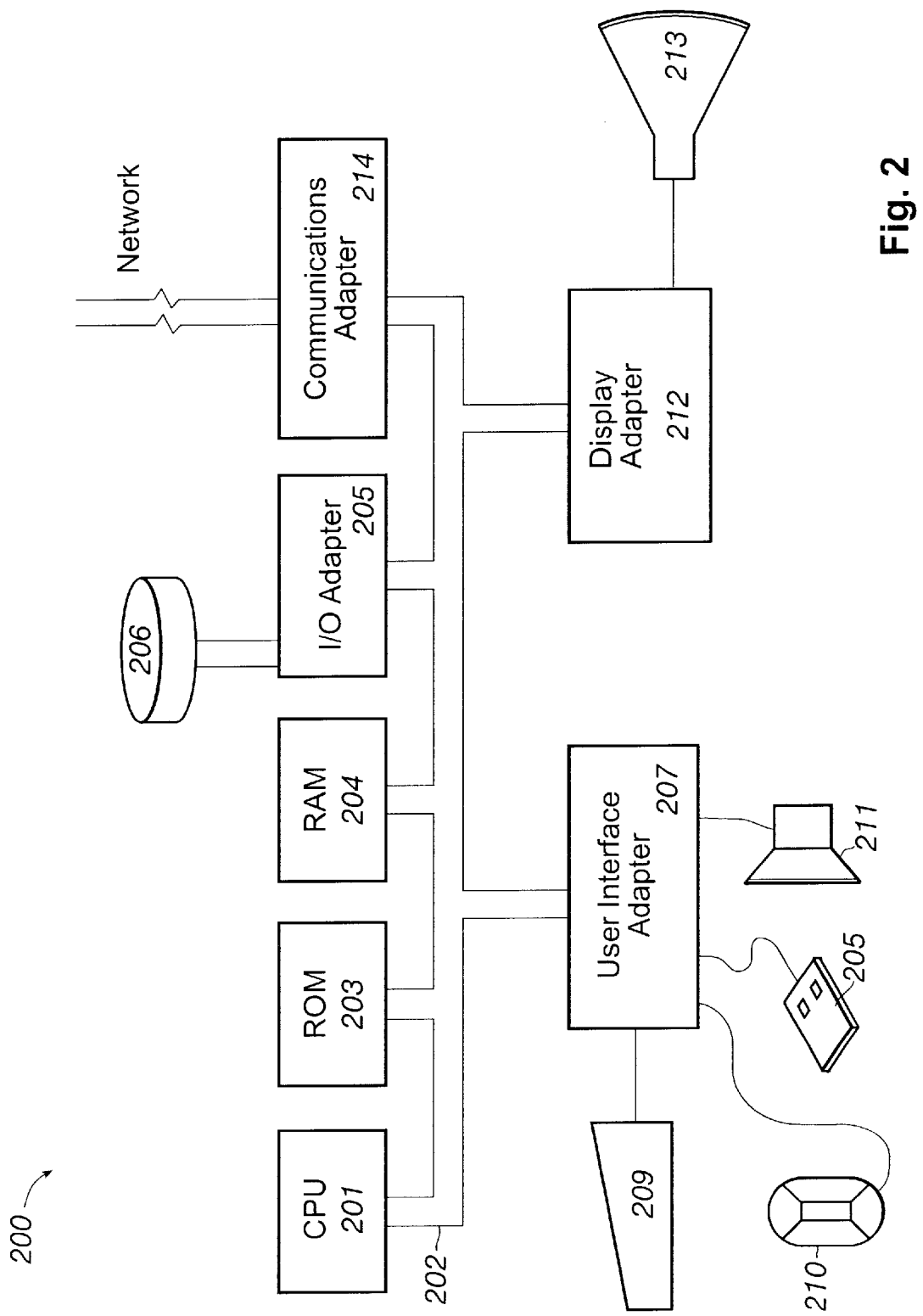
FIG. 2 is a more detailed functional block diagram of a processing system suitable for use in one or more of the processing nodes of the system in FIG. 1.

FIG. 2 is a high level functional block diagram of a representative data processing system 200 suitable for practicing the principles of the present invention. System 200 is an example of an endpoint, one of endpoints 112–117, and also may be used to implement server 101 and various repeaters throughout system 100. Processing system 200, includes a central processing system (CPU) 201 operating in conjunction with a system bus 202. CPU 201 may be for example, a reduced instruction set computer (RISC), or a complex instruction set computer (CISC). System bus 202 operates in accordance with a standard bus protocol, such as the ISA protocol, compatible with CPU 201.

CPU 201 operates in conjunction read-only memory (ROM) 203 and random access memory (RAM) 204. Among other things, ROM 16 supports the basic input output system (BIOS). RAM 204 includes for example, DRAM (Dynamic Random Access Memory) system memory and SRAM (Static Random Access Memory) external cache.

I/O Adapter 205 allows for an interconnection between the devices on system bus 202 and external peripherals, such as mass storage devices (e.g., a hard drive, floppy drive or CD/ROM drive), or a printer. A peripheral device 206 is for example, coupled to a peripheral control interface (PCI) bus, and I/O adapter 205 therefore may be, for example, a PCI bus bridge.

User interface adapter 207 couples various user input devices, such as keyboard 208, mouse 209, touchpad 210 or speaker 211 to the processing devices on bus 202.

Display adapter 212 supports a display 213 which may be for example a cathode ray tube (CRT), liquid crystal display (LCD) or similar conventional display unit. Display adapter 212 may include among other things a conventional display controller and frame buffer memory.

System 200 can be selectively coupled to a computer or telecommunications network through communications adapter 214. Communications adapter 214 may include for example, a modem for connection to a telecommunications network and/or hardware and software for connecting to a computer network such as a local area network (LAN) or wide area network (WAN).

Figure 3B:
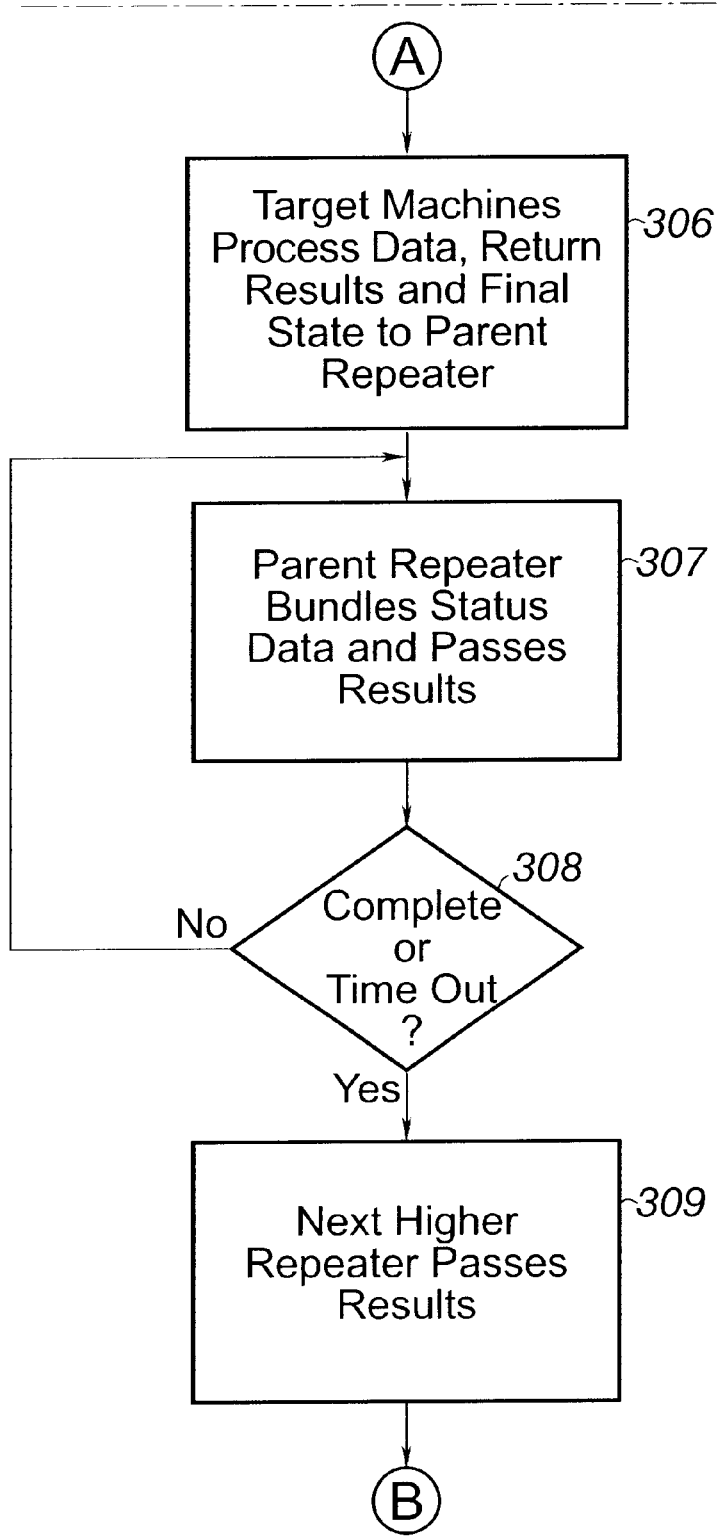
Figure 3C:
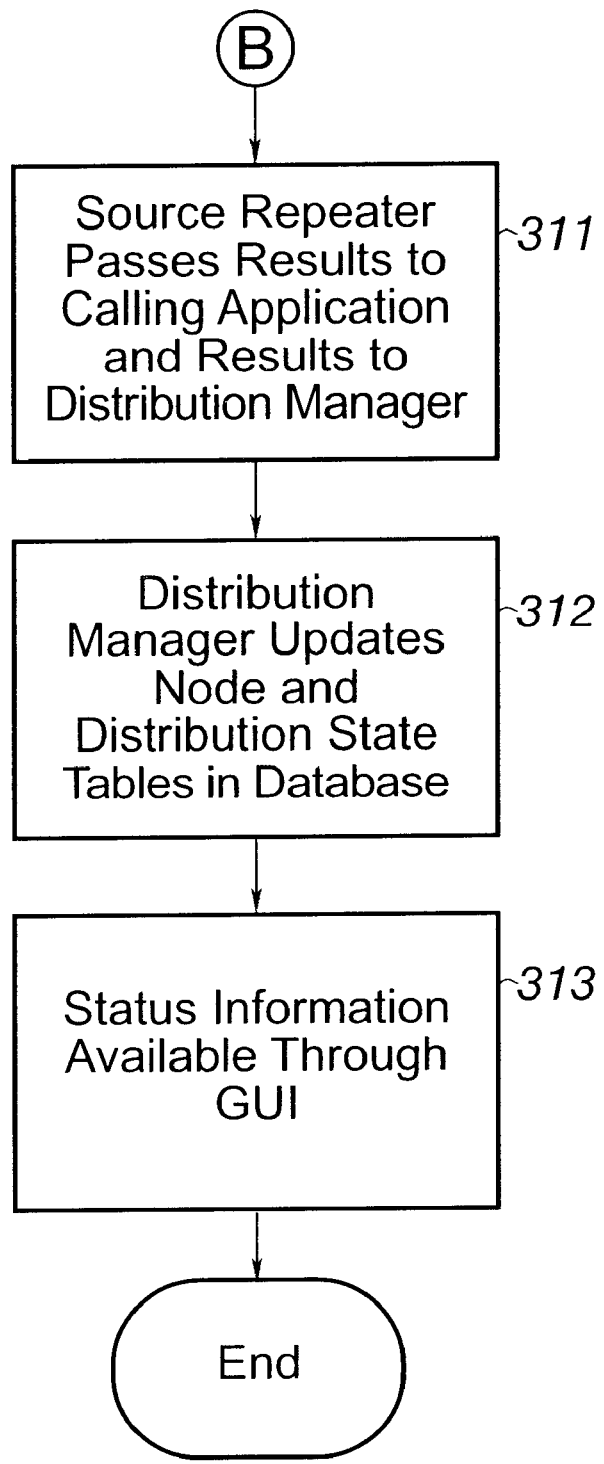

FIGS. 3A–3C are flow diagrams illustrating a bulk data distribution monitoring procedure 300 embodying the principles of the present invention. The application running on a given source repeater 104 in system 100 initiates the procedure by prompting the distribution manager to register the distribution. Specifically, at Step 301, the selected source repeater 104 passes a description of the data to be distributed along with a list of endpoints 112–117 to the distribution manager at Step 301. The distribution manager then, at Step 302, generates a unique ID identifying the distribution transaction and determines a routing to the endpoints 112–117 through the hierarchy of repeaters. As noted above, the distribution manager has available to it a multiplicity of redundant paths which allows it to optimize performance. For example, the distribution manager could select the source repeater and intervening communications links which have the best available bandwidth at the time.

At Step 303 the distribution manager creates and updates a Distribution State Table and Node State Table, in database 102 associated with the distribution transaction by the unique ID. In the preferred embodiment, the distribution manager creates an entry in the Distribution State Table such as shown in TABLE 1 and an entry in the Node State Table such as shown in TABLE 2. In the preferred embodiment, the Distribution Table is arranged in a number of rows and columns, with each distribution assigned a row and the corresponding columns representing the data fields for that distribution. As can be seen from TABLE 1, a given entry in the Distribution State Table identifies the distribution by its ID, the target machines and the source repeater, and maintains corresponding timing parameters describing the progress of the transaction. With regards to the Node State Table, a row (entry) is created for each node involved in the distribution, including all repeaters and targets. Each node is identified by a unique node ID. The columns (fields) are associated with the distribution through the use of the distribution ID. Each Node State Table entry maintains information concerning the state of the corresponding node, and in particular, information tracking the performance of the node with respect to selected timing parameters.

The distribution manager returns the unique distribution ID to the source repeater at Step 304. Then, at Step 305, the data being distributed (i.e., the distribution data) is passed from the given source repeater 104 through the repeater hierarchy via the route defined by the Distribution Manager. The distribution process continues at Step 306 until all of the endpoints 112–117 have received the distribution data. During this time, each repeater may maintain information for each of the corresponding targets, such as that provided in TABLE 3 (A method and apparatus for checkpoint restarts which may be used in conjunction with the associated data in Table 3 is described in the commonly owned, co-pending U.S. Patent Application entitled "Apparatus for Restarting Interrupted Data Transfer and Method Therefor" incorporated herein by reference.)

The statistics of TABLE 3 for a given endpoint can be used to make the following calculations, which can be returned to the Distribution Manager for updating the database:

transfer speed=number of bytes downloaded/(current time–time download started);

time remaining=(distribution size–byte offset)/transfer speed;

download time=time download finished–contact time; and total install time=time application finished–contact time.

Target machine operations are typically ongoing through the distribution transaction. Possible states of a given endpoint, such as one of endpoints 112–117 are shown in TABLE 4. As can be seen, the downloading process to a given endpoint processor can be successful, can fail, be rejected or halt due to a lack of memory space. The endpoint processor may also be performing other tasks and therefore be unavailable. The downloading process can also be canceled, paused or interrupted by a node higher up in the architecture of network 100 through the direction of an application, or a user (via a GUI or, alternatively, a command line interface). Moreover, the distribution lifetime may elapse and the operation simply expire. In particular, any time an endpoint processor enters or leaves a pause, unavailable state, or interrupted state, a message, such as that those in TABLE 5, is sent through the network to the Distribution Manager, such that the Distribution and Node State Tables can be updated.

Each endpoint 112–117 generates a report on its final status, including for example, the information listed in TABLE 5. This information (i.e., successful, failed, available, etc.) is returned to the corresponding parent (gateway) repeaters 118 and 119 associated with the given endpoints. At Step 307, each of these parent repeaters 118, 119 collects and bundles the status information received from the corresponding endpoints 112–117. Repeaters 118 and 119 continue to do this until either a specified time interval has elapsed or all of the endpoints 112–117 associated with that repeater, and receiving the distribution data, have reported back (Step 308). The results are then, at Step 309, passed up the repeater hierarchy. Specifically, each level collects and bundles the status information from the next lower level of repeaters, until then information is received by the server 101 (Step 311). The distribution manager application running on server 101 then updates the database at Step 312. As a result, at Step 313, the status information is available to the system users through a graphics user interface (GUI), command line program or custom SQL query.

In the case of successful transactions at the endpoint 106 level, the results of the processing, if any, of the distributed data are returned to the calling application 106. Preferably, these results are not stored in the database by the Distribution Manager. It should be noted that final status data and results can be returned through the same route taken by the data distribution, but that this is not a requirement.

FIGS. 4a–4d are illustrations of exemplary GUI window display which are preferably used to allow the system high level administrators and/or end users access to information regarding the data distribution. The upper half of these windows display the global status of the current distribution. The tree view on the left provides a filter for the display of distributions with certain properties while the view on the right side shows the global status of the distribution wherein each row represents an active or completed distribution and the columns show data from the Distribution State Table from the database.

Figure 4A:
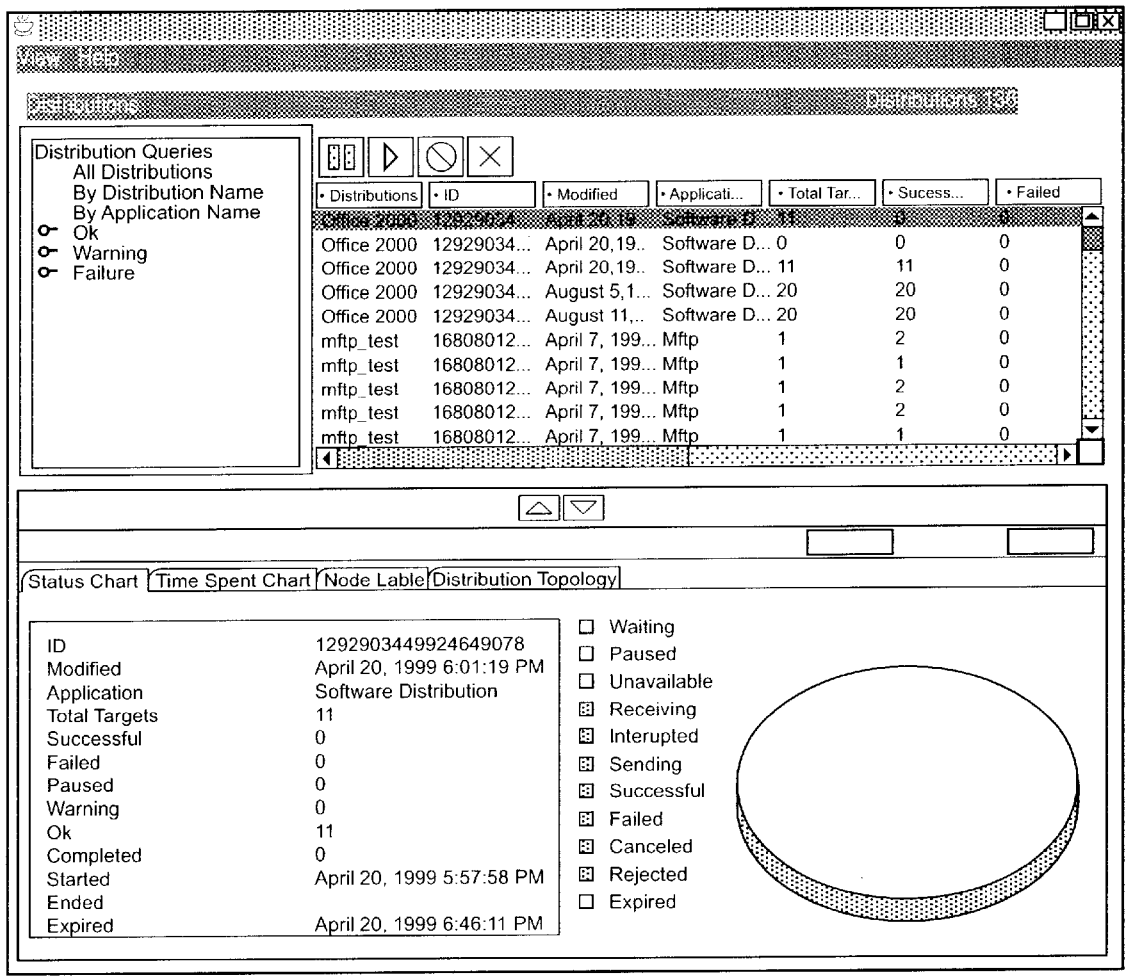
FIG. 4a provides a status chart pie graph representing the number of targets in each
Figure 4B:
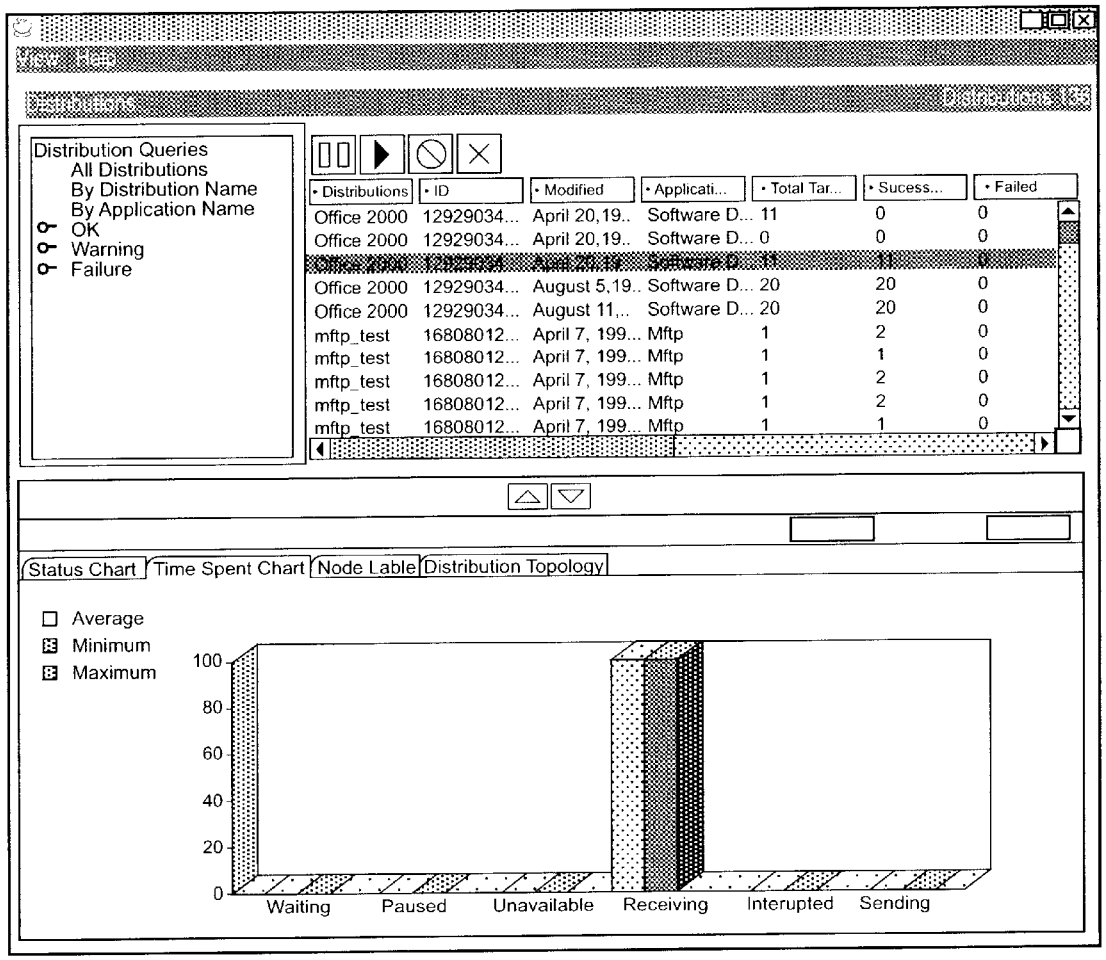
FIG. 4b illustrates a time spent chart which is a histogram displaying the minimum, average, and maximum time spent by the targets in each state.
Figure 4C:
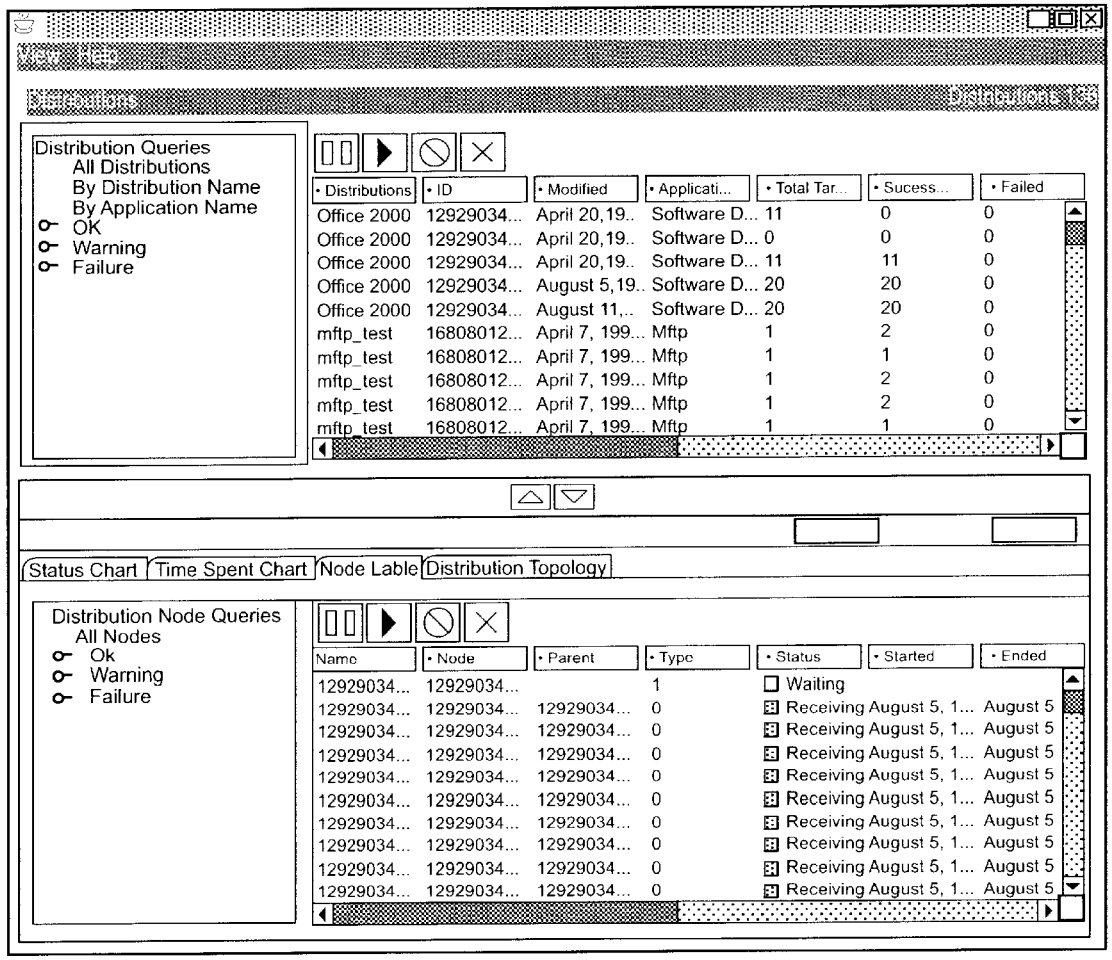
FIG. 4c illustrates a display of the information from the Node State Table from the database.
Figure 4D:
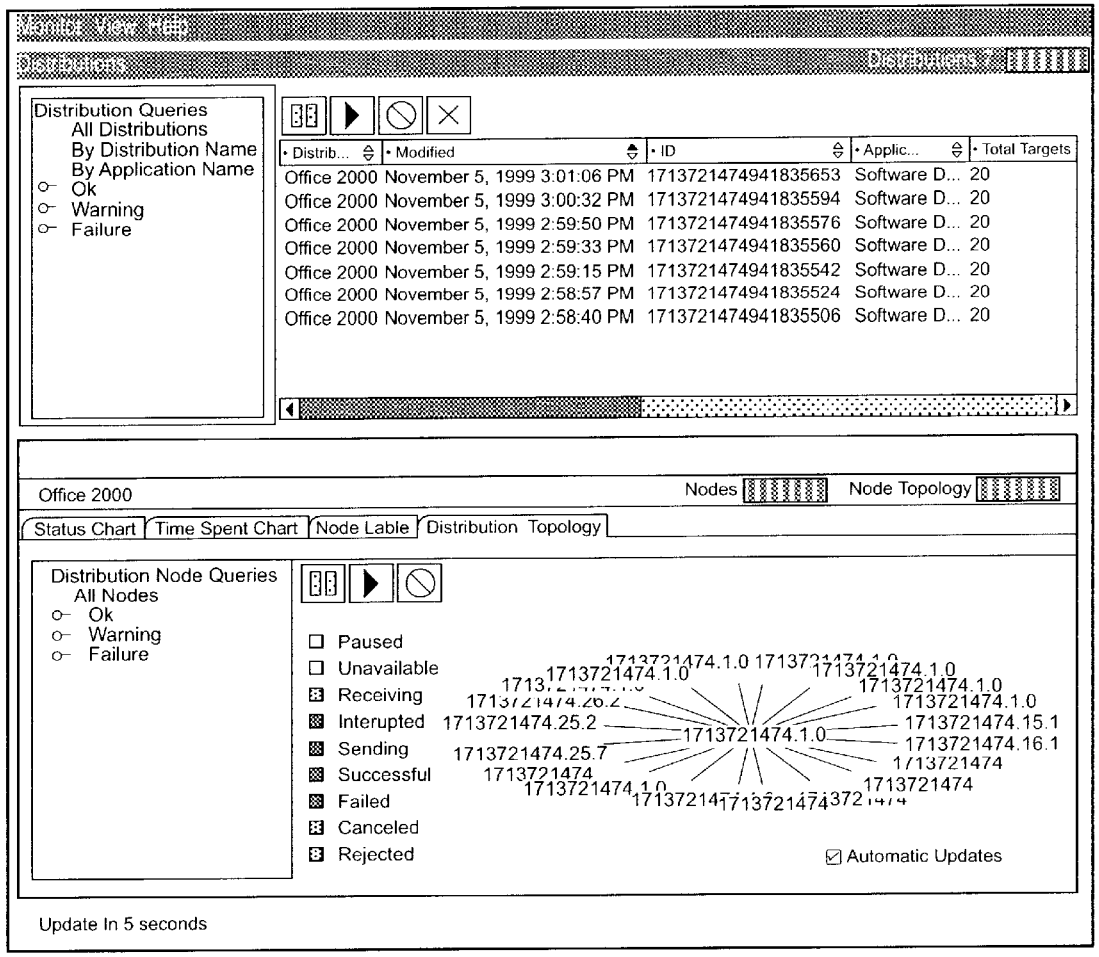
FIG. 4d illustrates a graphical display of a distribution topology.

The bottom half of the GUI windows show various ways of displaying specific information. For example, in FIG. 4a, a status chart is provided as a pie graph representing the number of targets in each state. In FIG. 4b, a time spent chart is shown which is a histogram displaying the minimum, average, and maximum time spent by the targets in each state. A display of the information from the Node State Table from the database is shown in FIG. 4c. It is also noted that a distribution topology, which would be a graphical view displaying the hierarchy of the repeaters and targets and the state of each node could also be displayed in the lower window of the GUI. Such an exemplary graphical display of the distribution topology is shown in FIG. 4d.

During the course of its distribution, the administrator server operator may wish to cancel, pause or resume the distribution. In these situations, all the repeaters and target machines involved in the distribution must be notified of the required action. The principles of the present invention advantageously provide such a notification mechanism which can scale to large numbers of repeaters and target machines.

Figure 5B:
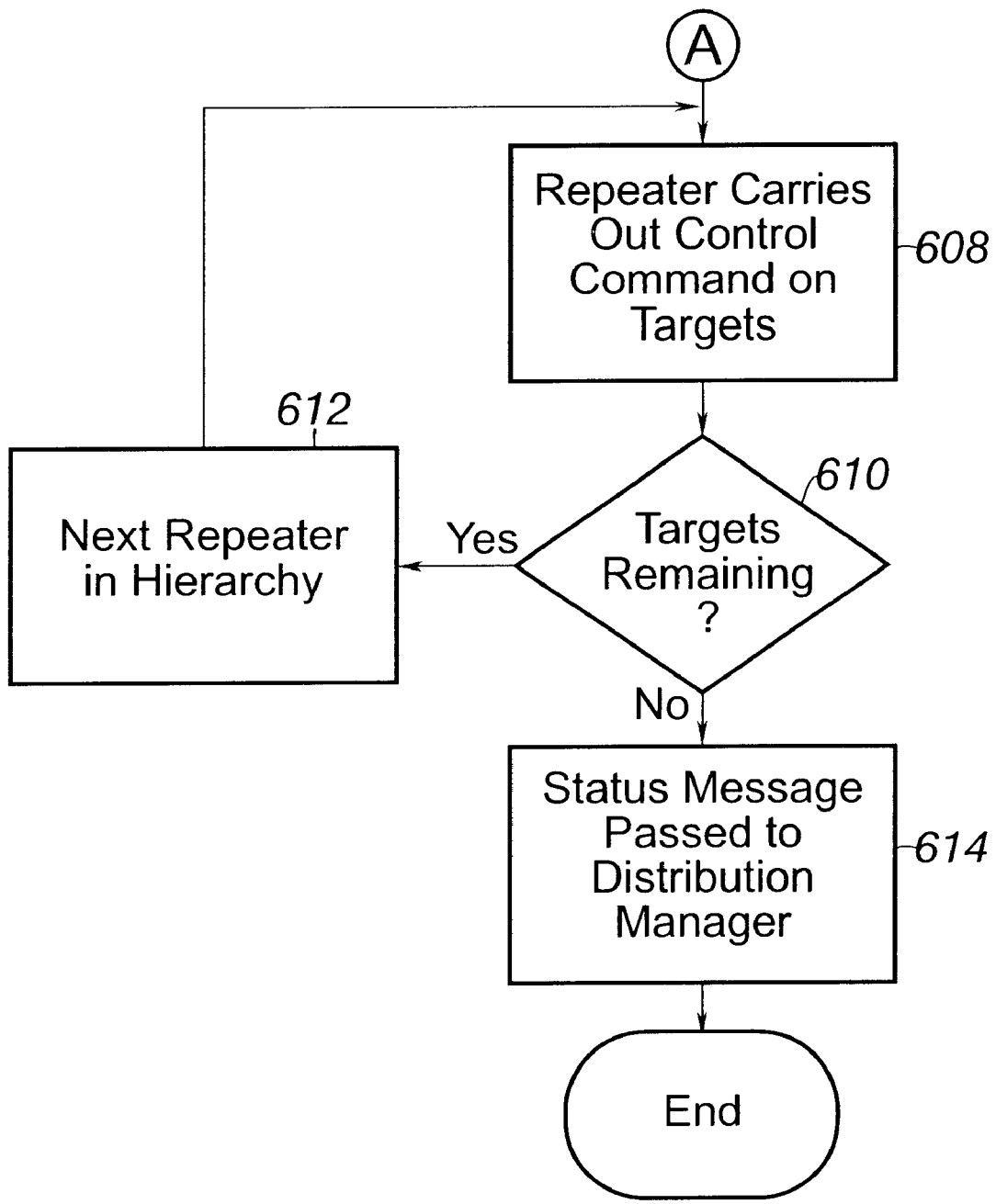
FIG. 5 (including partial view 5a and 5b) illustrates a preferred messaging procedure.

The notification of repeaters and endpoints is implemented by sending a control message which includes key value pairs that specify recipient repeaters and the actions to be taken. The structure and contents of a preferred control message are shown in TABLE 6. A preferred messaging procedure 600 is illustrated in FIG. 5. Control transmission procedure 600 begins with the initiation of a control action, such as a cancellation of the distribution, the pause of the distribution or resumption of the distribution following the pause. Control actions can be effectuated by the system administrator-using terminal 107 associated with server 101, at a source reporter 104/105, or at selected end-user terminal 106. This initiation process can be effectuated through a GUI action, a command line program or as the result of the execution of an application program.

At Step 602, the unique ID assigned to the affected distribution is passed on to the Distribution Manager. Optionally, a list of endpoints affected may also be explicitly provided to the Distribution Manager. If no explicit list of endpoints is provided, the distribution manager will apply the control action to all targets in the specified distribution as indicated by the corresponding entry in the database.

At Step 603, the Distribution Manager retrieves information from the database identifying the original route taken by the distribution. Then, at 604, the Distribution Manager builds a control message which is passed to the distribution source repeater at Step 605. In Step 604, the route identified in Step 603 is "pruned" to include only those branches containing targets to be controlled. At Step 606, the control message is then passed through the remainder of the distribution hierarchy in accordance with the route information retrieved from the database. In Steps 608–612, each repeater in the hierarchy carries out the control command on the corresponding targets. In Step 614 a status message is passed to the Distribution Manager. The status message may include information as described in conjunction with Table 5.

Although the present invention and its advantages have been described in detail, it should be understood that various changes, substitutions and alterations can be made herein without departing from the spirit and scope of the invention as defined by the appended claims.

TABLE 1

Distribution State Table

| Field Column Name | Description |
| --- | --- |
| Distribution ID | Unique distribution ID. |
| Owner | User ID of user starting distribution. |
| Label | Description of distribution for viewing by user. |
| Size | The Size of the distribution. |
| Source Application | Name of applications that started distribution. |
| Source Node | ID of source repeater. |
| Start Time | Time distribution started. |
| Finish Time | Time last status received. |
| Expire Time | Time at which distribution expires. |
| Last Update Time | Time database was last altered. |
| Last Operation | Last user operation (cancel, pause, resume). |
| Target Count | Number of targets. |
| Completed Count | Number of targets that have completed. |
| Waiting Count | Number of targets in specified state. |
| Paused Count | |
| Unavailable Count | |
| Receiving Count | |
| Interrupted Count | |
| Sending Count | |
| Successful Count | |
| Failed Count | |
| Canceled Count | |
| Rejected Count | |
| Expired Count | |
| Waiting Report | Number of endpoints reporting times in a specified state. These are used to calculate the average time in each state (Average Time = Total time/Report). |
| Paused Report | |
| Unavailable Report | |
| Receiving Report | |
| Interrupted Report | |
| Sending Report | |
| Successful Report | |
| Failed Report | |
| Canceled Report | |
| Rejected Report | |
| Expired Report | |
| Min Waiting Time | Minimum time reported for this state. |
| Min Paused Time | |
| Min Unavailable Time | |
| Min Receiving Time | |
| Min Interrupted Time | |
| Min Sending Time | |
| Max Waiting Time | Maximum time in this state. |
| Max Paused Time | |
| Max Unavailable Time | |
| Max Receiving Time | |
| Max Interrupted Time | |
| Max Sending Time | |
| Total Waiting Time | Total Time in this state. |
| Total Paused Time | |
| Total Unavailable Time | |
| Total Receiving Time | |
| Total Interrupted Time | |
| Total Sending Time | |

TABLE 2

Node State Table

| Column Name | Description |
| --- | --- |
| Distribution ID | Unique distribution ID. |
| Node ID | ID of node (both repeaters and target endpoints are stored). |
| Parent Node ID | Parent node ID stored so that distribution path can be recreated. |
| Current State | State of endpoint. |
| Previous State | Previous endpoint state |
| Start Time | Time distribution started to endpoint. |
| Finish Time | Time distribution finished to endpoint. |
| Last Update Time | Last time status updated. |
| Interruption Count | Number of times distribution was interrupted. |
| Unavailable Count | Number of time target was unavailable. |
| Receiving Time | Time spent sending data to endpoint. |
| Interrupted Time | Time spent in interrupted state. |
| Sending Time | Time spent spending data. |

TABLE 3

Repeater Endpoint Information

| Information | Description |
| --- | --- |
| Endpoint State | The current state of the endpoint (see table). |
| Contact Time | Time at which the endpoint method was called for the first time. |
| Start Time | Time at which the current instance of the endpoint. method was invoked. If a distribution is interrupt. Contact Time. |
| Number of Restarts | Number of Time distribution has been restarted due to pauses, interruptions, etc. |
| Byte Offset | Current position within the distribution of the download |
| Bytes Downloaded | Bytes downloaded during the current session (during this invocation of the endpoint method) This will be the same as Byte Offset, unless checkpoint restart found a partial download on the target. In this case, Byte Offset - Bytes Downloaded will be checkpoint restart offset. |
| Last Write | Last time data was written to the client. |
| Download Finished | Time at which the download completed. |
| Application Finished | Time at which the application returned. |
| Total Interrupted Time | Total time spent in an interrupted (Paused) Interrupted, and Unavailable) state. |

TABLE 4

Target States

| State Type Message | Type Description |
| --- | --- |
| Waiting (Intermediate Event) | Destination is waiting to receive the distribution. |
| Downloading (Intermediate Event) | Distribution is being downloaded to the endpoint. |
| Processing (Intermediate Event) | All of the distribution's data has been received by the endpoint and is being processed. |
| Successful (Final Event and Result) | Distribution has completed successfully. |
| Distribution Error (Final Event and Result) | An error has occurred while transferring data to the endpoint. |
| Application Error (Final Event and Result) | The application processing the distribution encountered an error. |
| No Space (Final Event and Result) | Insufficient disk space on endpoint to hold and process distribution. |
| Interrupted (Intermediate or Final Event) | Distribution was interrupted for a recoverable error; it will be resumed. |
| Unavailable (Intermediate or Final Event) | Distribution was interrupted because the endpoint was unavailable. The distribution will be re-attempted when the endpoint logs back into its LCF Gateway. Will fail when lifespan has been reached. |
| Paused (Intermediate Event) | Distribution was paused. |
| Canceled (Final Event and Result) | Distribution was canceled. |
| Rejected (Final Event and Result) | Distribution was rejected by the end user. |
| Expired (Final Event and Result) | Distribution has exceeded its life-span. |
| | The distribution is considered complete to an endpoint when that endpoint has reached a final state. Intermediate events occur too frequently to send events back to the distribution manager (instead the intermediate event information is stored in the lower level repeaters). Final states send results back to the calling application and final status information to the Distribution Manager. |

TABLE 5

Status Message

| Information | Description |
| --- | --- |
| Distribution ID | Distribution ID |
| Node Status List | List of target statuses. Each member of the Node Status List has the elements in Table 5a. |

TABLE 5a

Node Status List

| Information | Description |
| --- | --- |
| Node ID | Node ID |
| Target State | |
| Start Time | |
| Finish Time | |
| Unavailable Time | Length of time target is unavailable. |
| Receiving Time | Length of time target is receiving. |
| Interrupted Time | Length of time target is interrupted. |
| Interrupted Count | Number of times connection was interrupted. |

TABLE 6

Control Message

| Information | Description |
| --- | --- |
| Distribution ID | Distribution ID |
| Control Type | Type of control message, e.g. Pause, Resume, Cancel |
| Route Tree | Path used to send control message. Leaf nodes are targets (or endpoints) and intermediate nodes are repeaters |

What is claimed is:

1. A method of effectuating control actions in a computer network including a server running a distribution manager program, a database and a hierarchy of repeaters and endpoints, comprising the steps of:

initiating a selected control action;

passing a distribution identifier to the distribution manager identifying a data distribution to be controlled;

retrieving information from the database with the distribution manager identifying a route through the hierarchy of repeaters and endpoints for the data distribution;

creating a control message with the distribution manager identifying the selected control action; and passing the control message from the distribution manager via the identified route through the hierarchy of repeaters and endpoints.

2. The method of claim 1 wherein said step of initiating a selected control action comprises the substep of selecting a control action from the group consisting of the actions of pause, resume and cancel.

3. The method of claim 1 wherein said step of initiating comprises the step of initiating a control action through a graphical user interface associated with a selected one of the repeaters.

4. The method of claim 1 wherein said step of initiating comprises the step of initiating a control action with an applications program associated with a selected one of the repeaters.

5. The method of claim 1 wherein said step of initiating comprises the step of initiating a control action with a graphical user interface associated with the server.

6. The method of claim 1 wherein the control message comprises:

a first field identifying the control message;

a second field identifying the distribution to be controlled;

a third field specifying the selected control action; and a fourth field identifying the route to be taken by the control message through the hierarchy of repeaters and endpoints.

7. A method of controlling a data distribution in a computer network comprising a plurality of processing nodes, at least one of said nodes running a distribution manager program, the method comprising the steps of:

initiating a selected control action with a selected one of the nodes;

passing information to the distribution manager from the selected node identifying the data distribution;

identifying a route through the plurality of processing nodes being used for the data distribution;

creating a control message with the distribution manager, the control message comprising:

a first field identifying the control message;

a second field identifying the distribution;

a third field identifying the selected control action; and a fourth field identifying the nodes to receive the control message;

passing the control message to the nodes identified to receive the control message.

8. The method of claim 7 wherein the node running the distribution manager comprises a server and said step of initiating comprises the step of initiating a selected control action with the server.

9. The method of claim 7 wherein the plurality of nodes comprises a repeater and said step of initiating comprises the step of initiating a control action with the repeater.

10. The method of claim 7 wherein the plurality of nodes comprises an end-user terminal and said step of initiating comprises the step of initiating a control action with the end-user terminal.

11. The method of claim 7 wherein said step of initiating comprises the step of initiating a control action with an applications program running on the selected one of the processing nodes.

12. The method of claim 7 wherein said step of initiating comprises the step of initiating a control action through a graphical user interface associated with the selected one of the processing nodes.

13. The method of claim 7 wherein said step of initiating comprises the step of initiating a control action selected from the group consisting of cancel, resume, and pause.

14. A computer network comprising:

a plurality of end-user terminals for processing data received during a data distribution;

at least one repeater for selectively passing data during a data distribution to said end-user terminals; and a server running a distribution manager program operable in response to a prompt to:

identify a data distribution to be controlled;

retrieve information from an associated database identifying a route of said data distribution including said repeater to said end-user terminals;

generate a control message for effectuating a control action in said end-user terminals; and passing the control message to said repeater for transmission to said end-user terminals via said route.

15. The computer network of claim 14 wherein said repeater is operable to generate said prompt.

16. The computer network of claim 14 wherein said server is operable to generate said prompt.

17. The computer network of claim 14 wherein a selected one of said end-user terminals is operable to generate said prompt.

18. The computer network of claim 14 wherein said control message comprises:

a first field identifying the control message;

a second field identifying said distribution to be controlled;

a third field specifying said selected control action; and a fourth field identifying the route to be taken by the control message through said repeater to said endpoints.

19. A network comprising:

a plurality of data processing endpoints;

a plurality of repeaters for selectively distributing data to said endpoints; and a distribution manager for controlling data distributions to said endpoints through said repeaters and operable to:

receive information initiating a control action for a selected data distribution;

retrieve information from an associated database identifying a route of said selected data distribution to selected ones of said endpoints through selected ones of said repeaters;

generate a control message for effectuating the control action in said selected end-user terminals, said control message comprising:

an identifier of said control message;

an identifier said distribution to be controlled;

an identifier of said selected control action; and an identifier of said route through said repeaters to said endpoints; and passing the control message to said selected repeaters for transmission to said selected end-user terminals via said route.

20. The network of claim 19 wherein said identifier of said selected control action identifies a control action selected from the group consisting of pause, resume and cancel.

21. The network of claim 19 wherein said distribution manager comprises a program running on a selected one of said repeaters.

22. The network of claim 19 wherein said distribution manager comprises a program running on a server.

* * * * *